United States Patent
Bose et al.

[11] Patent Number: 5,805,876
[45] Date of Patent: Sep. 8, 1998

[54] METHOD AND SYSTEM FOR REDUCING AVERAGE BRANCH RESOLUTION TIME AND EFFECTIVE MISPREDICTION PENALTY IN A PROCESSOR

[75] Inventors: Pradip Bose, Yorktown Heights, N.Y.; Kin Shing Chan, Austin, Tex.; Hung Qui Le, Austin, Tex.; Robert Eric Wasmuth, Austin, Tex.

[73] Assignee: International Business Machines Corporation, Armonk, N.Y.

[21] Appl. No.: 723,171

[22] Filed: Sep. 30, 1996

[51] Int. Cl.[6] .................................................. G06F 9/38
[52] U.S. Cl. .................................. 395/581; 395/392
[58] Field of Search .................................. 395/383, 389, 395/392, 580, 581, 584, 586, 800, 585, 587, 421.03

[56] References Cited

U.S. PATENT DOCUMENTS

| | | | |
|---|---|---|---|
| 4,853,840 | 8/1989 | Shibuya | 395/584 |
| 5,142,634 | 8/1992 | Fite et al. | 395/587 |
| 5,511,172 | 4/1996 | Kimura et al. | 395/582 |
| 5,522,053 | 5/1996 | Yoshida et al. | 395/421.03 |
| 5,530,825 | 6/1996 | Black | 395/421.03 |
| 5,537,560 | 7/1996 | Boggs et al. | 395/595 |
| 5,634,103 | 5/1997 | Dietz et al. | 395/582 |

OTHER PUBLICATIONS

M. Johnson, "Supersealar Microprocessor Design", Prentice–Hall 1991, pp. 81–82.

*Primary Examiner*—Parshotam S. Lall
*Assistant Examiner*—Viet Vu
*Attorney, Agent, or Firm*—Kelly K. Kordzik; Winstead Sechrest & Minick P.C.; Anthony V. S. England

[57] ABSTRACT

Logic circuitry provides a fast resolution of conditional branch instructions in a high-performance superscalar processor. The logic circuitry facilities early (fast) resolution of a subset of conditional branches located within the first position of the primary instruction buffer within the processor enabling the overall branch processing logic to bypass history table-based prediction logic for such branches without crossing the cycle boundary. Thus, penalties associated with possible mispredictions for this subset of conditional branches are avoided.

30 Claims, 14 Drawing Sheets

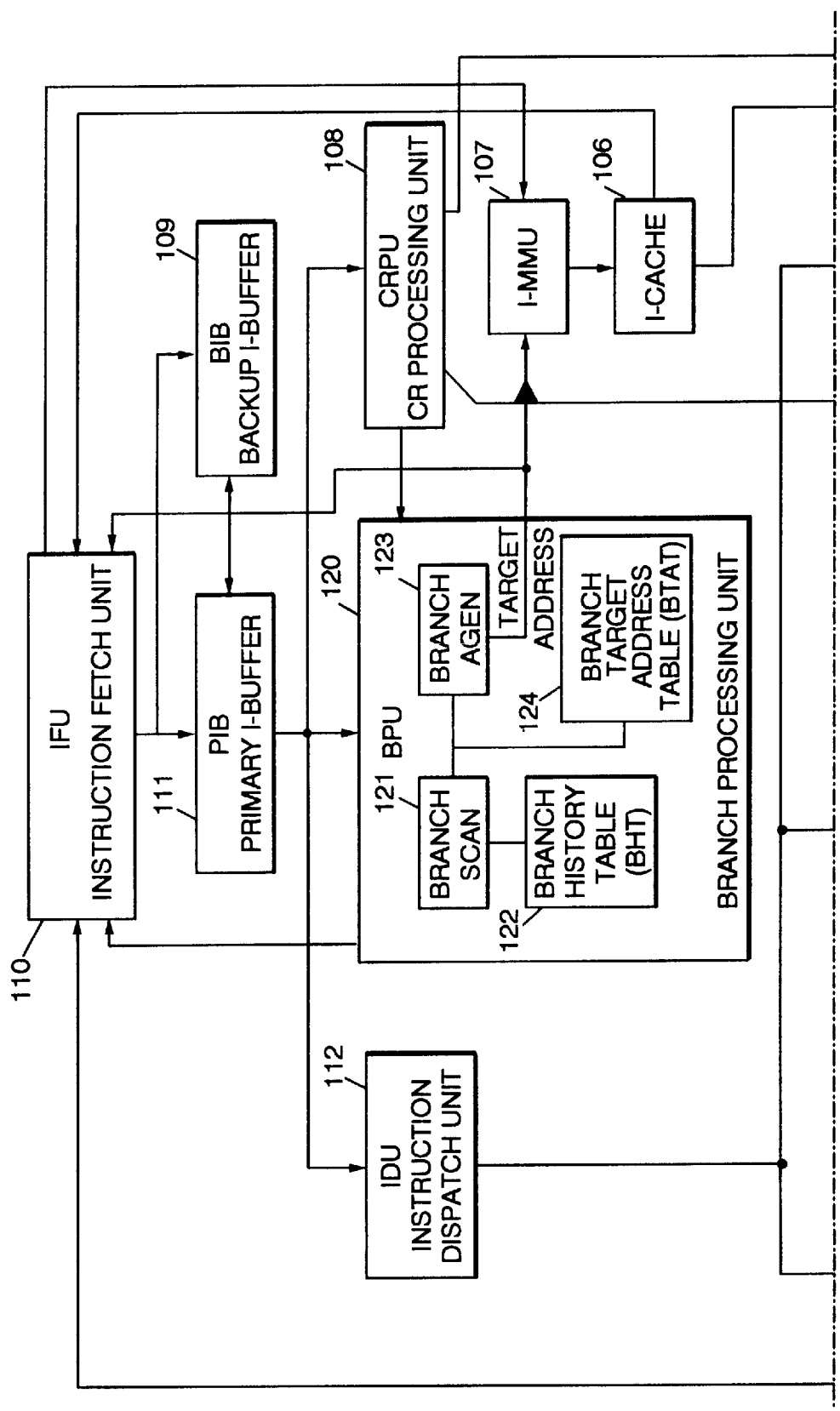

| FIG. 1A | FIG. 1B |

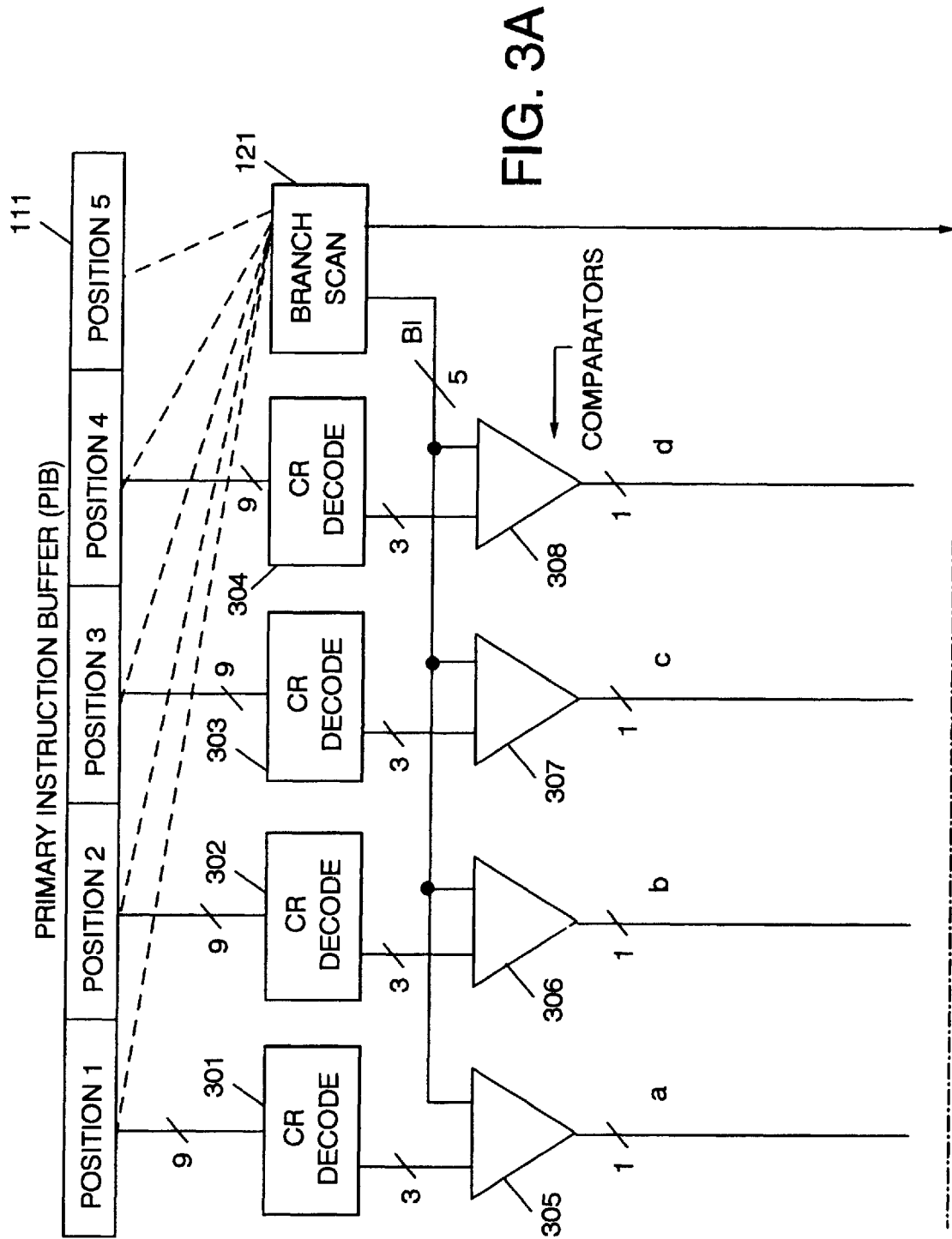

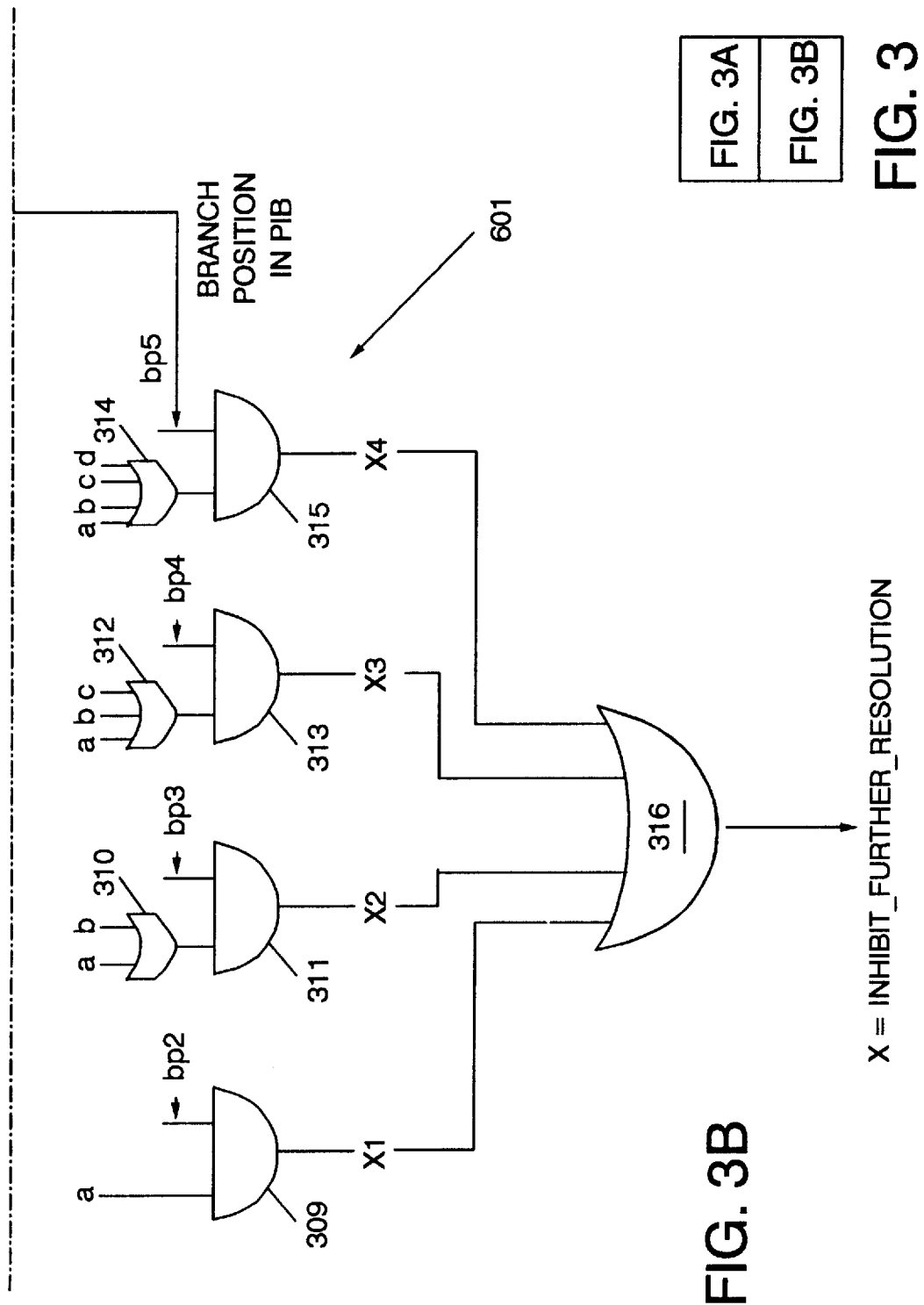

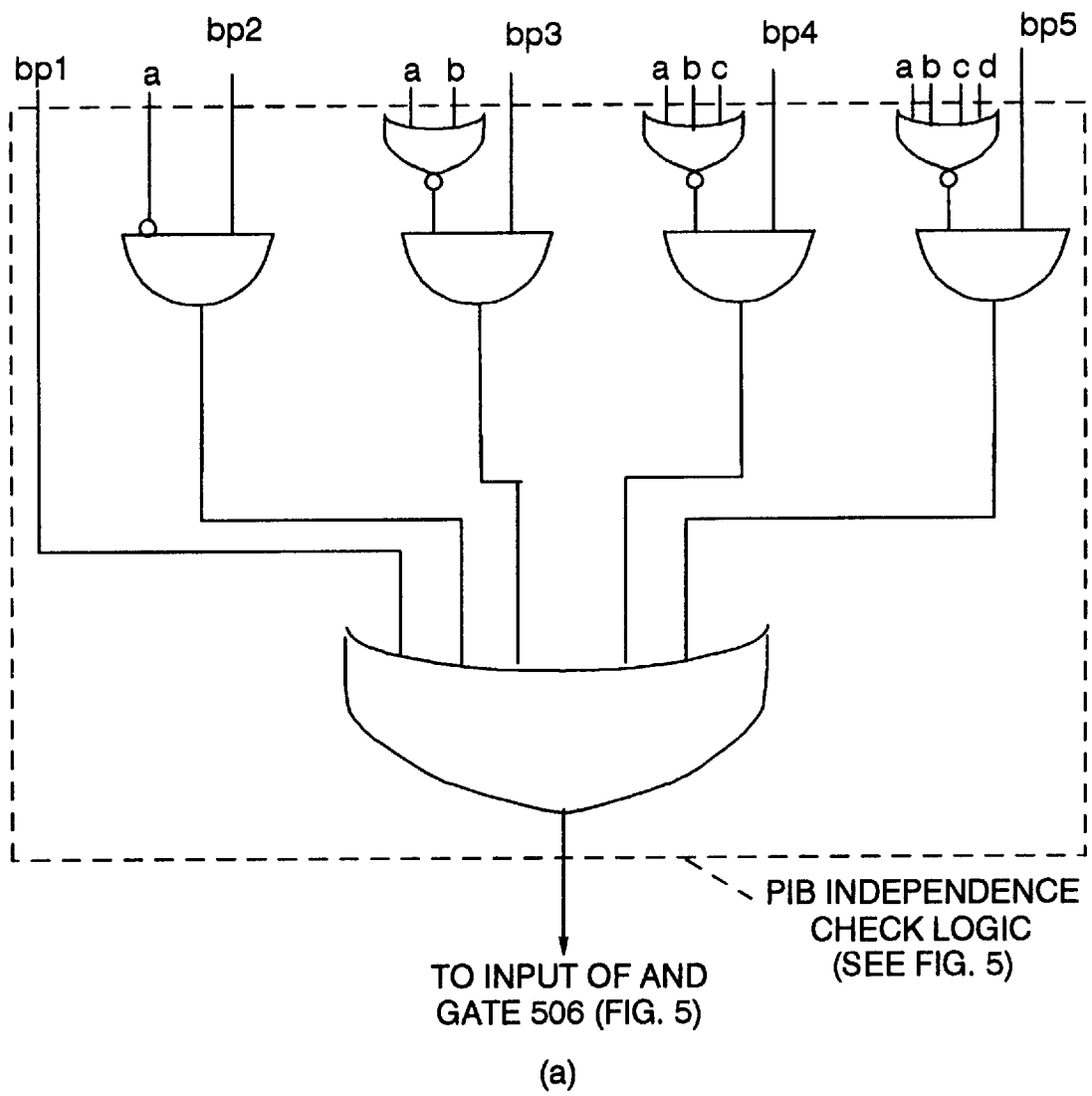
(a)
MOST AGGRESSIVE PIB INDEPENDENCE CHECK
FIG. 7
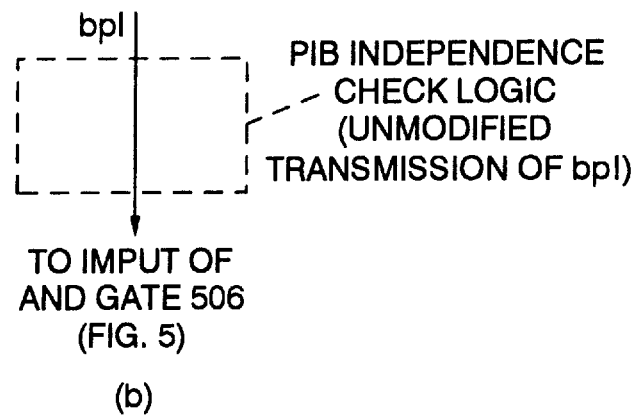
(b)
LEAST AGGRESSIVE PIB INDEPENDENCE CHECK

METHOD AND SYSTEM FOR REDUCING AVERAGE BRANCH RESOLUTION TIME AND EFFECTIVE MISPREDICTION PENALTY IN A PROCESSOR

TECHNICAL FIELD

The present invention relates in general to data processing systems, and in particular, to resolution of a branch instruction within a microprocessor.

BACKGROUND INFORMATION

A microprocessor implemented with a pipelined architecture enables the microprocessor to have multiple instructions in various stages of execution per clock cycle. In particular, a microprocessor with a pipelined, superscalar architecture can fetch multiple instructions from memory and dispatch multiple instructions to various execution units within the microprocessor for execution in parallel.

A problem with such an architecture is that the program being executed often contains branch instructions, which are machine-level instructions that transfer to another instruction, usually based on some condition (that is, it transfers if a specific condition is true or false). When a branch instruction encounters a data dependency, rather than stalling instruction issue until the dependency is resolved, the microprocessor predicts which path the branch instruction is likely to take, and instructions are fetched and executed along that path. When the data dependency is available for resolution of the aforementioned branch, the branch is evaluated. If the predicted path was correct, program flow continues along that path uninterrupted; otherwise, the processor backs up, and program flow resumes along the correct path.

The problem with predicting which branch will be taken is the addition of an effective branch misprediction penalty, which requires the microprocessor to purge all instructions along the mispredicted path and to retrieve the instructions pertaining to the taken path. In such a processor, such as the high-end PowerPC family of processors manufactured by International Business Machines, Inc. ("IBM"), the generalized branch resolution logic within the microprocessor is complex enough that the resolution signal for a scanned conditional branch is often not available within the scan cycle. This is true even for conditional branches that are resolvable at dispatch time. Branch prediction via a branch history table (BHT) look-up is available sooner, so that for all such branches, initial branch direction is guessed from the BHT prediction. Depending on the extent of lateness of the branch resolution logic, the misprediction penalty may be quite high; and, this may apply to all mispredicted, scanned branches, irrespective of their position in the instruction buffer and the status of the dependent condition code. This is because the full resolution logic is invoked in all cases.

As a result of the foregoing, there is a need in the art for improving the overall branch resolution logic to reduce the effective branch misprediction penalty within processors.

SUMMARY OF THE INVENTION

The foregoing need is addressed by the present invention which includes additional "fast" resolution logic within the branch processing unit of a microprocessor. The present invention adds extra (parallel) hardware logic for fast (1-cycle) resolution of a large subset of conditional branches, which are not resolvable in 1 cycle by invocation of the generalized branch dependence check and resolution circuitry. The overall (modified), multi-stage pipelined branch resolution circuitry described in this invention results in reduction of the average resolution time of conditional branch instructions. The subset of branches which qualify for such speeded-up resolution (referred to henceforth as "eligible" branches), include those which are in the first dispatchable position within the instruction buffer when first detected. The eligible branches must also pass additional checks (incorporated in the resolution circuitry) to ensure that the branch condition is already available in the condition register (CR). These eligible branches may be resolved sooner than other branches, because the number of comparisons needed to complete the dependency checks is smaller. For example, since there are no other instructions ahead of the first dispatchable instruction in the dispatch window, the resolution logic for this special case is leaner, thus providing a fast branch resolution path.

An advantage of the present invention is that a subset of conditional branches (depending on the frequency of eligible scanned branches) need not pay the large misprediction penalty incurred by the sole use of the generalized resolution logic within the branch processing unit.

In an implementation of the present invention, when the branch scan logic within the branch processing unit has scanned a branch within the instruction buffer, the early resolution logic is implemented to determine whether or not the scanned branch instruction may be immediately resolved. If so, the resolved branch direction information is used to override the BHT-predicted path, in deciding whether the branch target address should be transmitted to the instruction fetch unit ("IFU") to initiate a fetch sequence from that address.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 1A, FIG. 1B and FIG. 1 referred to collectively hereafter as FIG. 1 illustrates, in block diagram form, a microprocessor configured in accordance with the present invention;

FIG. 3A, FIG. 3B and FIG. 3 referred to collectively hereafter as FIG. 3 illustrates a branch dependency check logic circuit;

FIG. 7 illustrates a PIB independence check logic;

DETAILED DESCRIPTION

Figures 1, 1B:
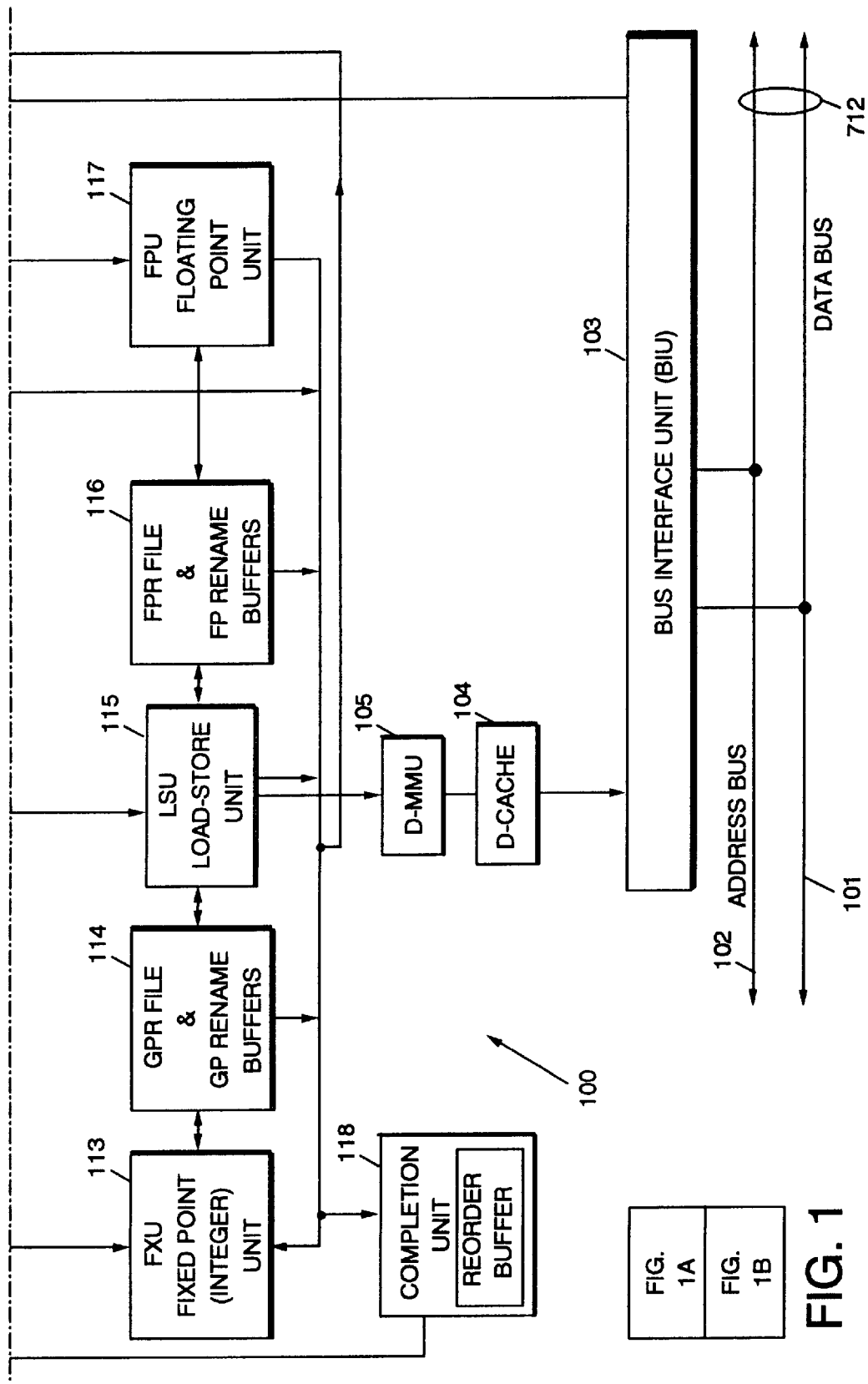

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is shown processor 100 coupled to bus 712 comprising address bus 102 and data bus 101. Processor 100 may be any known central processing unit (e.g., a PowerPC processor made by IBM) and includes some or all of the circuitry shown in FIG. 1.

Bus 712 is coupled to bus interface unit ("BIU") 103. Instruction cache ("I cache") 106 is coupled to BIU 103 and to instruction fetch unit ("IFU") 110. Instruction cache 106, which may include tag bits, is also coupled to instruction memory management unit ("I-MMU") 121.

Processor 100 also contains branch processing unit ("BPU") 110, primary instruction buffer ("PIB") 111, and instruction dispatch unit ("IDU") 112.

BPU 120 includes branch scan logic 121, branch address generator ("AGEN") 123, and BHT 122.

In a typical implementation, data is received from data bus 101 by BIU 103 and transferred through data cache ("D cache") 104 to load/store unit 115. Instruction cache 106 receives instructions from BIU 103 and passes these on to IFU 110.

BPU 120 is operable for receiving branch instructions and performing look-ahead operations on conditional branches to resolve them early. PIB 111 receives instructions from IFU 110 and passes these on to IDU 112. IDU 112 is operable for dispatching instructions to any one of several execution units, such as load/store unit ("LSU") 115, floating point unit ("FPU") 116, and fixed point integer unit ("FXU") 113. These execution units are also coupled to completion unit 118, which tracks instructions from dispatch through execution, and then retires, or "completes" them in program order. Completion unit 118 contains a queue of completion buffers, collectively known as the reorder buffer. Completion unit 118 is also coupled to IFU 110.

Also coupled to FPU 117 is FPR file and rename buffers 116.

Coupled to FXU 113 is general purpose register ("GPR") file 114 and associated general purpose ("GP") rename register buffers. Also coupled to BPU 120 is CR processing unit ("CRPU") 108.

Processor 100 may be a high-performance superscalar processor capable of issuing multiple instructions every cycle. During each clock cycle, IFU 110 attempts to fetch several instructions at one time, using the current "instruction fetch address" ("IFA"), which is stored within the instruction fetch address register ("IFAR"). The default IFA is the next sequential address following the last instruction fetched in the previous cycle. However, the IFA may be modified by BPU 120, if a scanned branch is resolved (or predicted) to be "taken." The IFA may also need to be reset to the true (resolved) branch path address following a detected misprediction.

Processor 100 may include backup instruction buffer ("BIB") 109, in addition to PIB 111 in some implementations. This would limit speculative execution down p predicted branch paths, where p is the number of separate buffers within the BIB 109.

Figure 2:
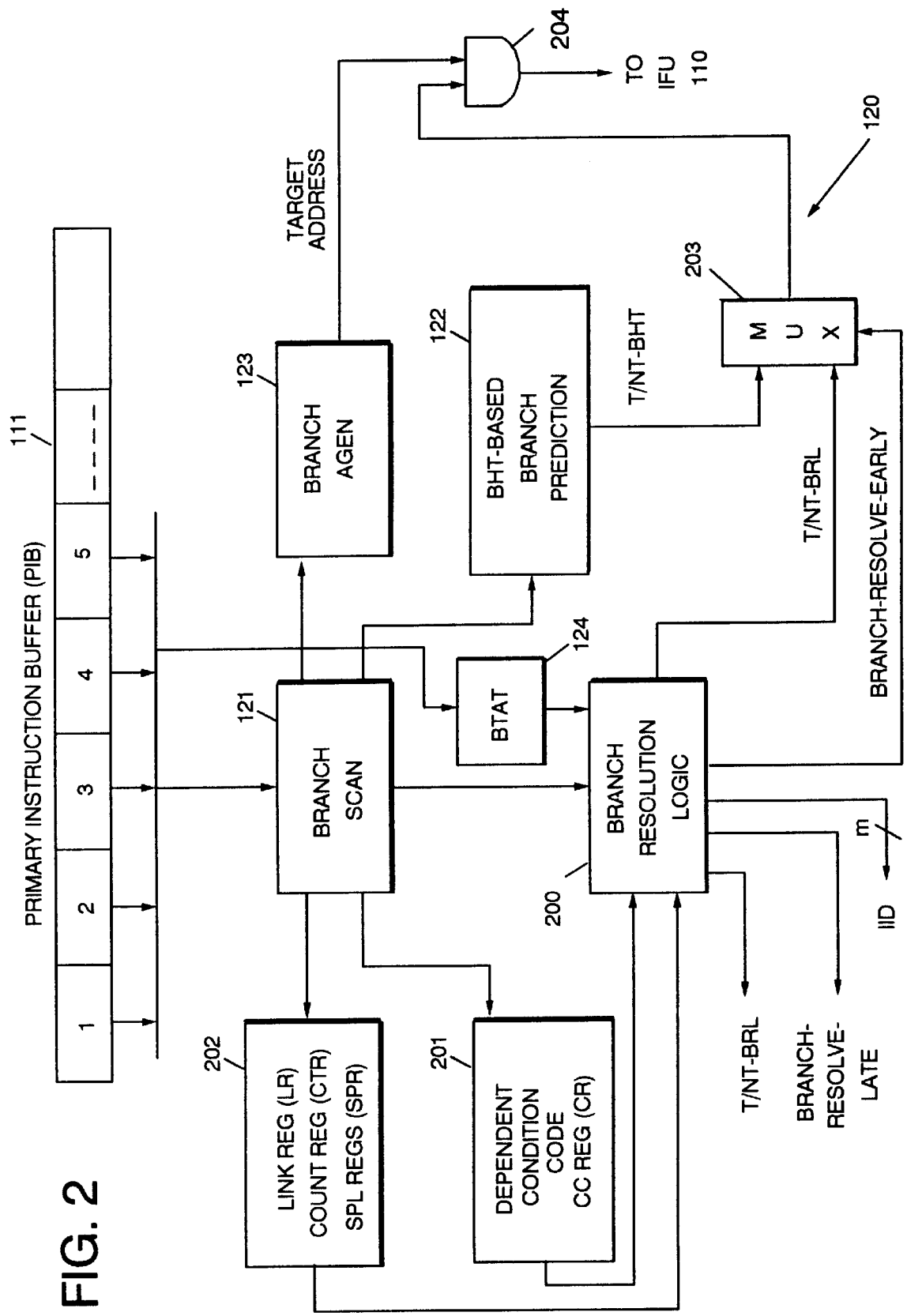
FIG. 2 illustrates, in block diagram form, further detail of the branch processing unit of the microprocessor illustrated in FIG. 1.

Referring next to FIG. 2, there is illustrated in further detail BPU 120. BPU 120 includes branch scan logic 121, branch address generator ("BRANCH AGEN") 123, branch resolution logic 200, dependent condition code 201 and BHT-based branch prediction logic 122.

Every clock cycle, the first N positions (N is a positive integer; in this example, N=5) of PIB 111 are scanned by branch scan logic 121 in attempting to detect a branch and then resolving its dependency in terms of an associated condition register field, specified by the branch instruction bits in the branch instruction.

Branch scan logic 121 scans PIB 111 (up to the fifth position) for the first branch instruction (also referred to herein as a "branch") during the dispatch cycle. As will be further described below, a subfield of the instruction address corresponding to the first scanned branch is then sent to BHT-based branch prediction logic 122, which immediately begins the process of making a prediction as to whether or not the branch will be taken. This prediction may be based on several different algorithms well-known in the art. Additionally, branch resolution logic 200 begins to attempt to resolve the branch by monitoring the state of the dependent condition code 201. (The dependent condition code ("CC") is eventually available in a field of the condition register ("CR")). In machines in which CR renaming is implemented, the CC may be available in a rename buffer at the time when the branch is being processed; or, the CC value may be "in flight" in that the relevant CC-generating instruction may be finishing in that cycle; or, the CC may be unavailable in the current branch scan/process cycle because the generating instruction has not yet been dispatched or executed. As will be made clear below, the branch resolution logic ("BRL") 200 proposed in this invention is made up of two parts: (a) a generalized resolution logic, which (in terms of net time delay) spans or exceeds the normal cycle boundary of the machine 100; and (b) an early resolution logic operating in parallel with (a) above, but built with fewer levels of logic circuitry, such that its output signal assertion is typically well within the machine's cycle boundary. The net effect of this scheme is to speed-up the average branch resolution time, since a large subset of the observed branches are covered by the early resolution logic. In any case, the overall branch resolution logic 200 has five outputs: the gating signal "Branch_Resolve_Early" which controls the multiplexer ("MUX") 203, the "Branch_Resolve_Late" signal, and two taken/not-taken ("T/NT") flags (T/NT-BRL$_{early}$ and T/NT-BRL$_{late}$) in conjunction with "Branch_Resolve_Early" and "Branch_Resolve_Late" respectively. Assertion of a T/NT flag means that the branch was resolved to be "taken" ("T"); negation means "not taken" ("NT"). In addition, the "Branch_Resolve_Late" output signal has an associated output, indicating the m-bit instruction id ("IID") of the resolved branch, where the maximum number of live instructions in the machine is at most $2^m$. This information relates the resolution to the corresponding processed branch, which may have been dispatched out of the PIB 111.

In a given cycle of branch scan, if the branch is deemed to be unresolvable because the instruction producing the dependent CC has not yet been dispatched or executed, further steps in branch resolution for this particular branch instruction are inhibited, and branch prediction is relied upon. This PIB-resident branch is marked: "processed-predicted", by setting a 2-bit attribute field, which is part of the PIB entry. (The possible qualifiers are: "unprocessed", "processed; predicted", "processed; resolved" and "processed: predicted, later resolved"). In subsequent cycle(s) the resolution logic for this "processed; predicted" branch is invoked again after being scanned. In general, a branch scan will proceed beyond branches marked "resolved" (i.e., either "resolved" or "predicted, later resolved") to detect the first branch (within the scan window: 5 in this example) which is either "unprocessed" or "processed: predicted". Branches which are marked "processed" (with any one of the three types) are eligible for dispatch within the issue-width (e.g. 3 in this example processor). However, only pertinent information about the branches which are as yet unresolved ("processed: predicted") are retained after dispatch in a separate branch target address table ("BTAT") 124. Both the predicted path address and the alternate path address are maintained for each entry of the BTAT 124, along with other information, e.g. the instruction identifier ("IID"), a valid ("V") bit, etc. "Resolved" branches are discarded after dispatch, except for the information entered in the reorder (completion) buffer: a mechanism (well-known in the art) which is internal to the completion unit 118; this is used to maintain program instruction sequence state for in-order completion and precise interrupt facility. The size (number of entries) of the BTAT 124 serves as an upper limit on the number of outstanding (predicted, but not resolved yet) branches supported by the hardware. The BTAT 124 also serves in the task of restarting program execution from the correct branch point, on the detection of a misprediction. Details of how such back-tracking is effected, via cancellation of instructions in the mispredicted path, pipeline flush and updating of information in the reorder buffer and the BTAT 124, are omitted in this document. Suffice it to say that the average misprediction penalty in machine cycles, increases as average branch resolution time increases. Thus, the present invention, in reducing the average branch resolution time, helps increase performance.

Multi-cycle resolution possibly needed for a given branch, may begin in a scan cycle n, but may end in cycle n+p (p>1), at which time the branch may still be in the PIB 111 (possibly in a different location) or it may have its descriptor held in the BTAT 124. Detailed description of the BTAT 124 organization, and how multi-cycle branch resolution continues after a processed branch has migrated to the BTAT 124 is not discussed in this document, since it is not germane to the use and implementation of this invention.

In a given cycle n, the branch prediction logic 122 upon predicting that the branch will be taken by asserting T/NT-BHT, will, if uninhibited, enable the transmission of the branch target address to IFU 110, so that IFU 110 may begin fetching a set of instructions beginning with the target address, in the following cycle (n+1). However, the above enabling signal from the branch prediction logic 122 is inhibited in case of early assertion (in cycle n) of the "Branch_Resolve_Early" signal generated by branch resolution logic 200. (Assertion of "Branch_Resolve_Early" indicates that the branch has been resolved; in that case the T/NT-BRL$_{early}$ signal from the branch resolution logic 200 gets selected by the MUX 203, to act as the potential enabling signal sent to AND logic 204 for transmission of the branch target address to the IFU 110.)

Note that the "Branch_Resolve" signals (early and/or late) may be sent to other parts of the machine 100 as well (such as the completion unit 118) for purposes not relevant to this invention. Hence, these paths are not explicitly shown in FIG. 2.

One critical control purpose which "Branch_Resolve_Late" along with its paired "T/NT-BRL$_{late}$" flag serves is to correct the effects of a branch misprediction. For example, in a given machine cycle n, the BHT-based branch prediction logic 122 may have predicted "taken" ("T") and the "Branch_Resolve_Early" signal was not asserted yet; so, the target address was fetched in the following cycle (n+1) and instructions from the target address stream may even have been dispatched subsequently (n+2). Eventually, say in cycle n+2, the "Branch_Resolve_Late" signal gets asserted. If the corresponding T/NT-BRL$_{late}$ flag asserts "T", then no corrective action is needed; otherwise, if the T/NT-BRL$_{late}$ flag negates to mean "NT" (not taken), corrective action logic is enabled to cancel "in flight" or executed instructions in the wrong (mispredicted) branch path and the machine 100 resumes execution after refetching from the correct branch path. This is an example of a situation where branch resolution was delayed due to invocation of the general resolution logic, since early resolution was not possible.

Referring next to FIG. 3, there is illustrated initial (i.e., first-stage) branch dependency logic invoked to determine if the scanned branch instruction can be resolved. This logic is invoked immediately in the cycle in which a branch is scanned. Branch scan logic 121 scans the first five positions of PIB 111 (the scanning procedure is shown by the dashed lines). Though not intending to limit the applicability of the present invention to other systems, each entry of PIB 111 has a full 32-bit PowerPC instruction, with additional pre-code bits (7 or 8), which pre-classify the instructions in to broad types to make subsequent decoding easier. Bits 0 . . . 5 (6 bits) of the instruction field contain the primary opcode. For compare instructions, bits 6 . . . 8 (3 bits) hold the specifier for the field (one of 8) within the condition register ("CR"), which is set after the compare is executed. For other functional operations, the primary opcode itself is sufficient to decode which CR field is targeted by the branch instruction, if it is CR-modifying. The "CR decode" logic within logic blocks 301–304 deciphers the 3-bit field of the CR which is targeted for modification, for a given instruction waiting for dispatch in PIB 111.

Branch scan logic 121 scans the instructions in the first five positions of PIB 111 to look for the first unprocessed branch. In doing so, it asserts at most one of the signals bp1 . . . bp5. For example, bp3 is asserted if the first branch detected is in position 3 of PIB 111. The BI field (bits 11:15, 5 bits) of the scanned branch instruction specifies the particular bit in the CR that needs to be monitored in doing the condition comparison. Each comparator 305–308 takes the 3-bit CR field specifier from CR decode logic blocks 301–304, respectively, and the 5-bit unique CR bit specifier ("BI") to see if they both indicate the same field. If there is a match on one or more positions, one or more of the signals a, b, c, d get asserted.

Signal a is received by AND gate 309 and OR gates 310, 312, and 314. Signal b is received by OR gates 310, 312, and 314, while signal c is received by OR gates 312 and 314, and signal d is received by OR gate 314. Signals bp2 . . . bp5 are received by AND gates 309, 311, 313, and 315, respectively.

AND gates 309, 311, 313, and 315 output signals X1, X2, X3 and X4, respectively, as indicators of whether a scanned branch is dependent on a condition code to be set by one of its preceding instructions, still waiting to be dispatched in PIB 111. In other words, if one of the signals X1, X2, X3, and X4 is asserted during the scan/dispatch cycle, then it is known that a branch instruction has been scanned which cannot be resolved immediately because its dependent CR-modifying instruction is not dispatched yet. OR gate 316 receives signals X1, X2, X3 and X4 and outputs a signal X="Inhibit_Further_Resolution" if any one of the signals X1, X2, X3, X4 is asserted.

Figure 4:
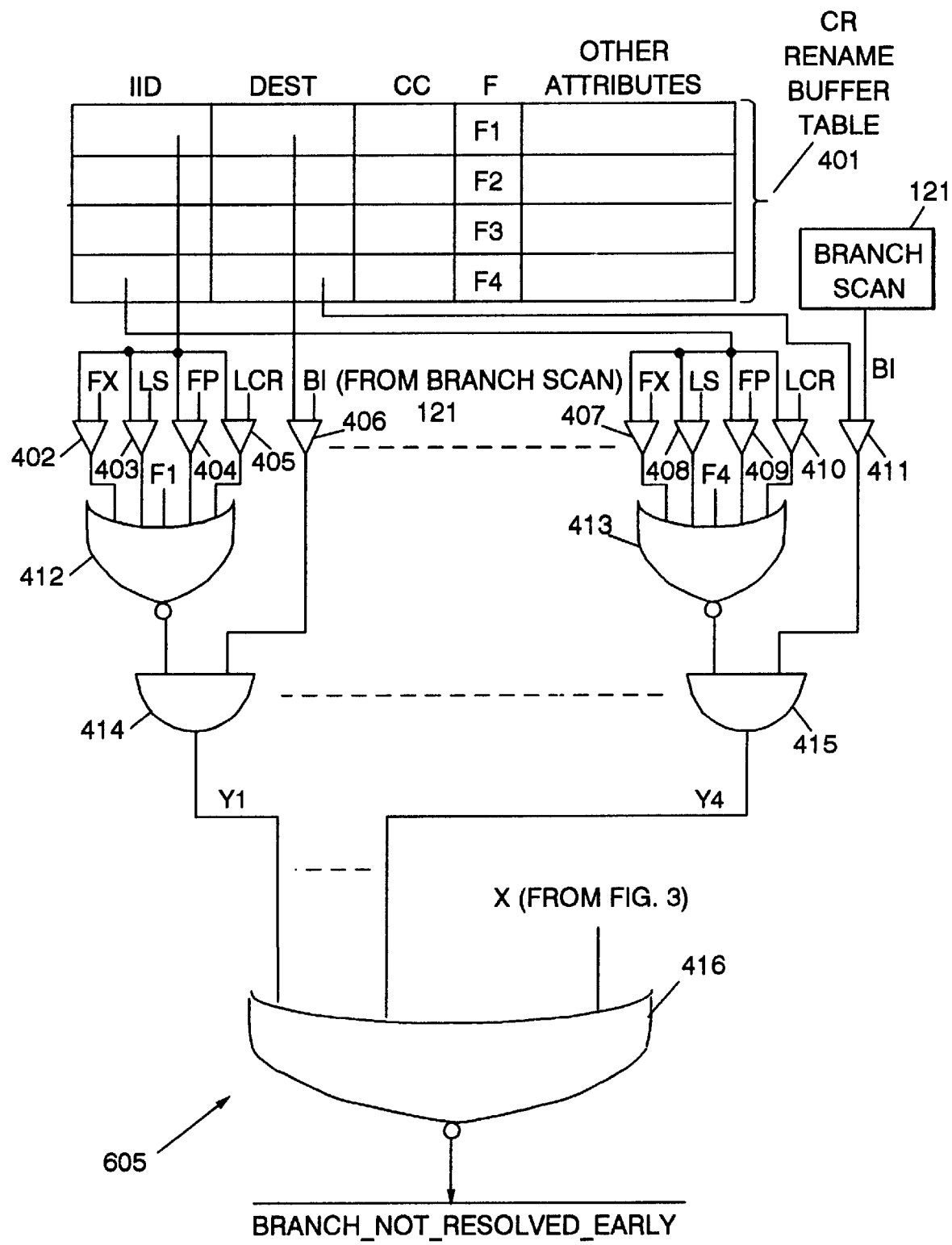
FIG. 4 illustrates a branch dependency check on the condition register at execution time.

Referring next to FIG. 4, there is illustrated additional logic circuitry for making a branch dependency check (for a given branch instruction), during cycle n+1, where n is the cycle of branch scan. This particular logic is invoked only if X (=Inhibit_Further_Resolution) was 0 (negatively asserted) for the particular branch in cycle n. This is implied by the inclusion of the input X (from FIG. 3) as an enabling signal for the final NOR gate 416 in FIG. 4. In reality, the X value in cycle n+1 is the latched value of X generated in cycle n. Nominally, the X input value of NOR gate 416 is high, holding the output Y to 0, irrespective of the values of the other inputs of gate 416 (Y1 through Y4). An X value of 0, generated in cycle n+1 from a latched value of X in cycle n, allows the outcome of the dependency check logic in cycle n+1 to be gated to the output Y.

Assuming that CR-renaming is present, there would be a CR rename buffer table 401 (4-entry table in this example) to hold the CR-modification information for up to k (=4 in FIG. 4) finishing or finished CR-modifying instructions. The CR-rename buffer table 104 is physically located in the CRPU 108 (FIG. 1). Corresponding to each of the four entries of the CR rename buffer table 401, there are four sets of identical logic, acting in parallel and feeding their outputs to NOR gate 416. Shown in FIG. 4 are two of these sets of logic, separated by ellipses (. . .) indicating replicated parts which are not included for brevity. CR rename buffer table 401 has entries therein which are sampled by various ones of comparators 402–406 . . . 407–411 and the four NOR gates 412 . . . 413. The four AND gates 414 . . . 415 feed their outputs Y1 through Y4 into OR gate 416, which also receives the X signal described earlier. Branch scan logic 121 provides the BI signal to four comparators 406 . . . 411. (Like X, this BI value in cycle n+1, is actually the value latched in the branch scan cycle n). The instruction identifier (IID), corresponds to the unique tag which gets associated with every live instruction in processor 100, as recorded by the entry position in the reorder buffer within completion unit 118. The destination (DEST) field specifies the field of the CR which is targeted for modification by the given pending instruction. The finish (F) field specifies the status (finished/waiting completion, versus pending) of the instruction. The CC field stores the value (result) of the condition comparison, which will be used to update the architected CR on instruction completion.

For each of the four entries of Table 401, the corresponding set of comparators (e.g., 402–406 for entry 1) are used to check if any of the instructions finishing "this cycle" is setting the CR field on which the scanned branch is dependent upon. FX, LS, FP and LCR stand for IID's of CR-modifying instructions finishing out of the FXU 113, LSU 114, FPU 117 and the CRPU 108, respectively. (These "finished" IID's output by the various functional units, are physically routed to the BPU 120 via the CRPU 108: see FIG. 1). The four "finished" bits F1 through F4 are also used within NOR gates 412 . . . 413. The final NOR gate 416 receives the X signal in addition to outputs from AND gates 414 . . . 415, which cover cases in which the dependent condition code cannot be resolved during cycle n+1, where n is the branch scan cycle. Thus, if any of the inputs to NOR gate 416 gets positively asserted, the output Y is held negated, which signifies that the scanned branch is not resolvable early, i.e., in the current cycle (n+1). Thus, logically speaking, Y is equivalent to Branch_not_resolvable_early. With X pulsing down to 0 in cycle n+1, if Y becomes positively asserted, it is used to enable further steps in branch resolution in this cycle. If Y is held negated, additional steps in resolution of the candidate branch instruction are inhibited for this cycle (n+1) and the execution-time dependency check and resolution attempt (see logic block 1004 in FIG. 10 and related discussion later on) are repeated in the following cycle for the same branch. A negatively asserted Y in cycle n+1 is also used to disable the branch scan process in cycle n+2; that is the two-stage (scan-resolve) pipeline is stalled, until multi-cycle resolution is able to resolve the pending (yet-to-be-resolved) branch.

Figure 5:
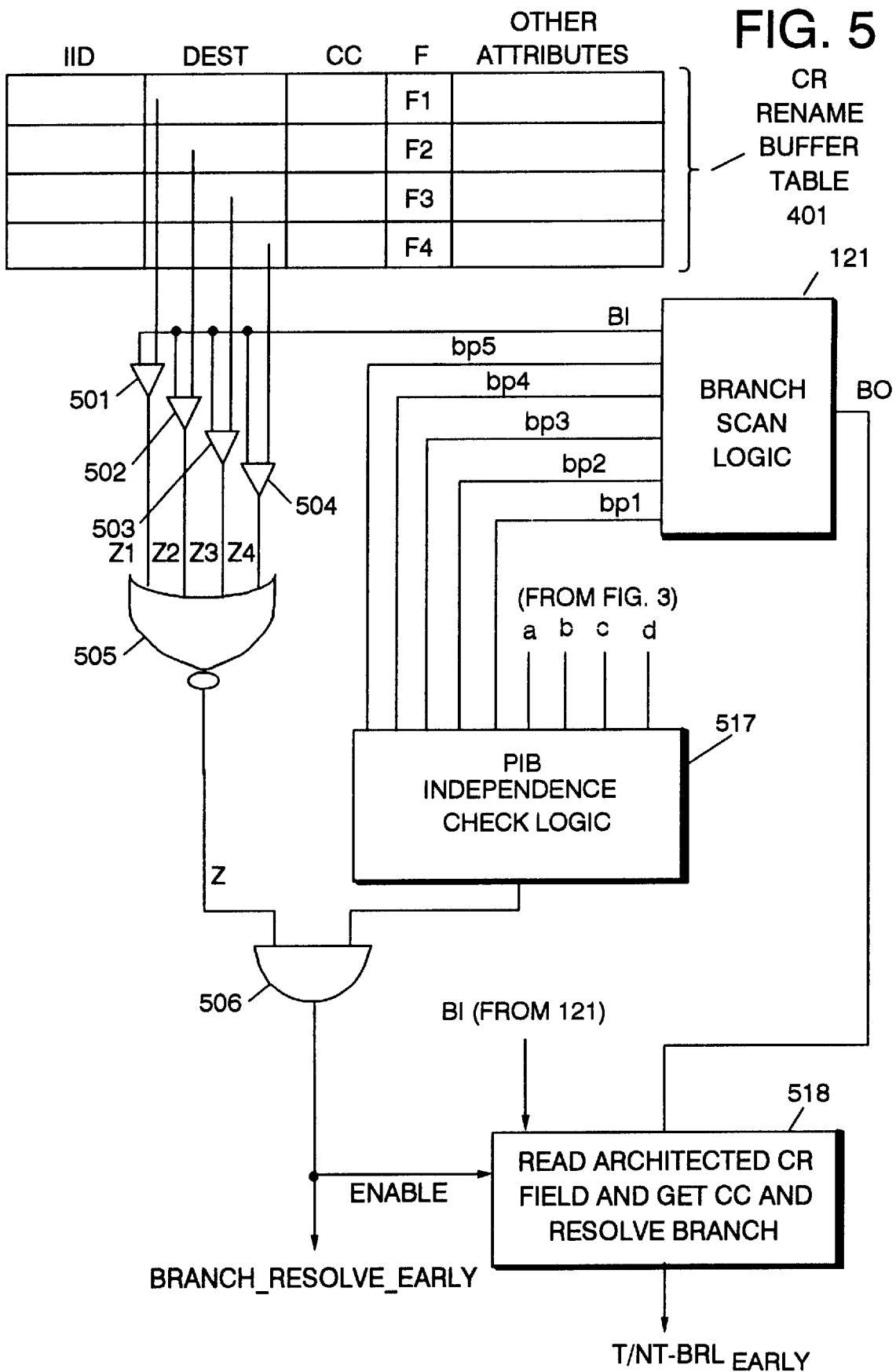
FIG. 5 illustrates fast branch resolution logic.

Referring next to FIG. 5, there is illustrated CR rename buffer table 401 again along with early resolution logic, which helps reduce the average branch resolution logic in this invention. This early resolution logic is able to resolve a branch scanned in the very cycle of scan (e.g., cycle n), for a large class of cases. Such a case arises when a branch ("unprocessed" or "processed: predicted") is scanned in position i within PIB 111 ($1 \leq i \leq 5$), with no other branches in positions 1 through i-1, and for which the dependent CC is already available in the architected CR. In FIG. 5 (as in FIG. 3), Boolean flags bp1 through bp5, produced by the Branch Scan Logic 121 in the branch scan cycle (say machine cycle n), indicate whether a branch was found in position 1 through 5 (respectively) in the PIB 111. Signals a, b, c, d are identical to those derived as outputs of comparators 305–308 in FIG. 3. Logic block 517, labeled "PIB Independence Check Logic" asserts a Boolean output of '1' if the scanned branch is not dependent on any of the earlier instructions waiting for dispatch in the PIB 121. The other input to AND gate 506, namely the output (labeled Z) of NOR gate 505 asserts a '1' if none of the destination ("DEST") field entries of the CR Rename Buffer Table 401 match up with the BI field specified within the scanned branch instruction. The inputs (Z1 through Z4) to NOR gate 505 come from the outputs of comparators 501 through 504 (respectively). As an example, Z1 is '0' if the DEST field of the first entry in the PIB 111 is different from the specification implied by the BI field. Thus, if Z1 through Z4 all remain negatively asserted ('0'), we can be sure that the instruction with the dependent CC, if already dispatched, must be completed and therefore, the required dependent CC value is available in the architected CR. This inference is true because at the time of dispatch from the PIB 111, a CR-modifying instruction causes an entry to be reserved in the CR Rename Buffer Table 401. (If such a free entry is not available, dispatch is inhibited for that cycle). Thus, Branch_Resolve_Early (output of AND gate 506) gets positively asserted if the scanned branch is not dependent on any earlier instruction still waiting to be dispatched and if it is determined that the dependent CC is already available in the CR.

Figure 6:
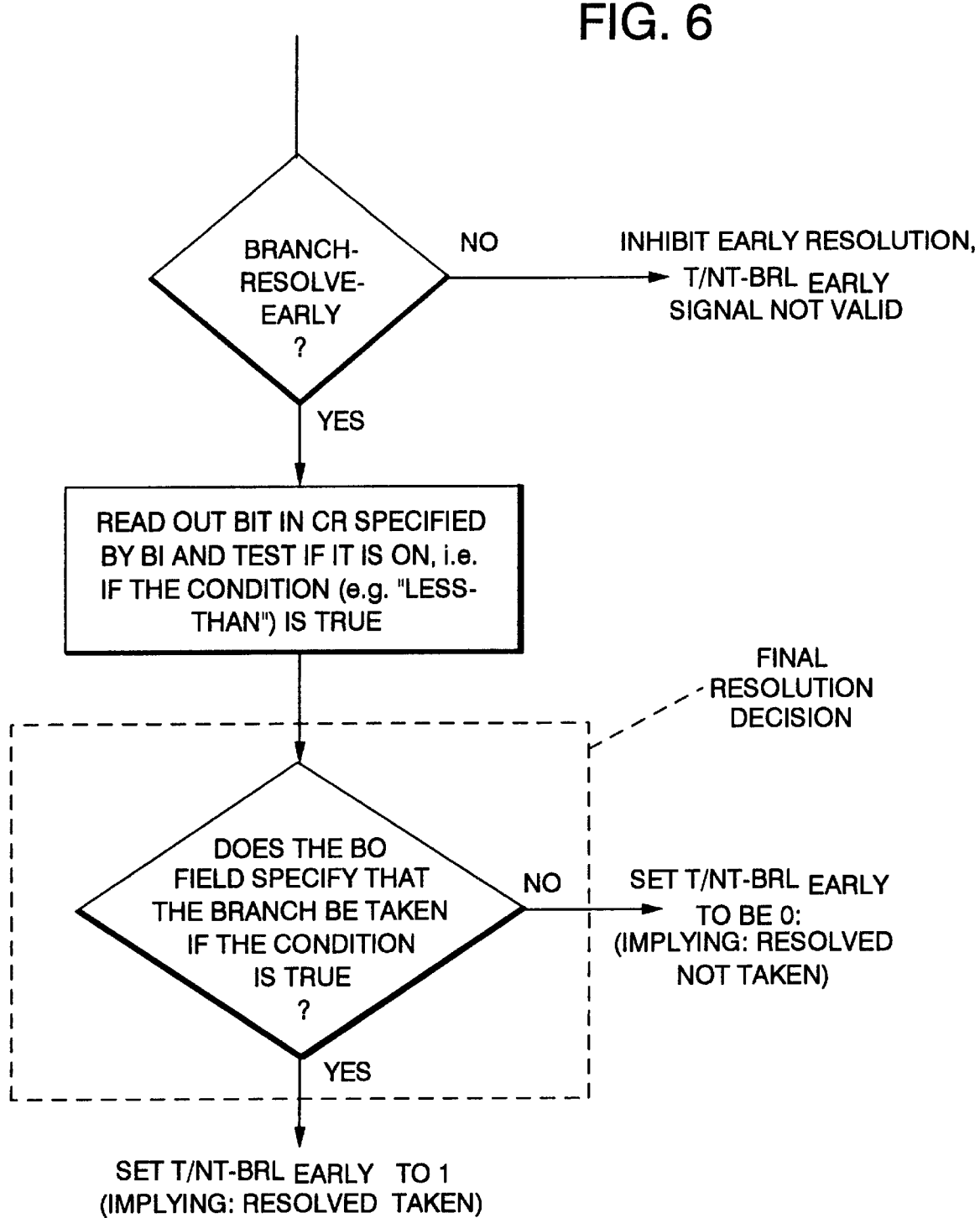
FIG. 6 illustrates a flow diagram in accordance with the present invention.

If Branch_Resolve_Early gets positively asserted in the cycle of branch scan, it is used to enable reading the field of the CR specified by BI. The BO field, also obtained from the scanned branch instruction, specifies whether the branch should be resolved to be "taken" or "not taken" if the condition tested is found to be true. Thus, logic block 518 is able to output the signal T/NT-BRL$_{early}$ which is used to override the BHT-produced prediction, as described earlier. Note that Branch_Resolve_Early and its associated T/NT-BRL$_{early}$ are designed to be stable well within the same cycle (n) in which the corresponding branch has been scanned. FIG. 6 shows the flow chart of the logic implemented by logic block 518.

Referring next to FIG. 7, there are illustrated two example implementations of the PIB independence check logic block 517 (FIG. 5). In (a) we show the most aggressive logic, wherein, the Boolean equation bp1+$\bar{a}$·bp2+$\bar{a}$·$\bar{b}$·bp3+$\bar{a}$·$\bar{b}$·$\bar{c}$·bp4+$\bar{a}$·$\bar{b}$·$\bar{c}$·$\bar{d}$·bp5 is implemented. This would capture all those cases where a scanned branch does not depend on any of the yet-to-be-dispatched earlier instructions waiting in the PIB 111. However, if this piece of logic is in a critical path of the 1-cycle early resolution circuitry of FIG. 5, one may use a less aggressive independence check. The least time-critical implementation, shown in FIG. 7(b), is of course when the flag bp1 alone is used. In this case, we enable early resolution only for those branches which happen to be in position 1 of the PIB 111, during the branch scan cycle. Position 1 branches do not have any dependencies with yet-to-be-dispatched branches, because there are no other instructions ahead of it in the PIB 111.

Figure 8:
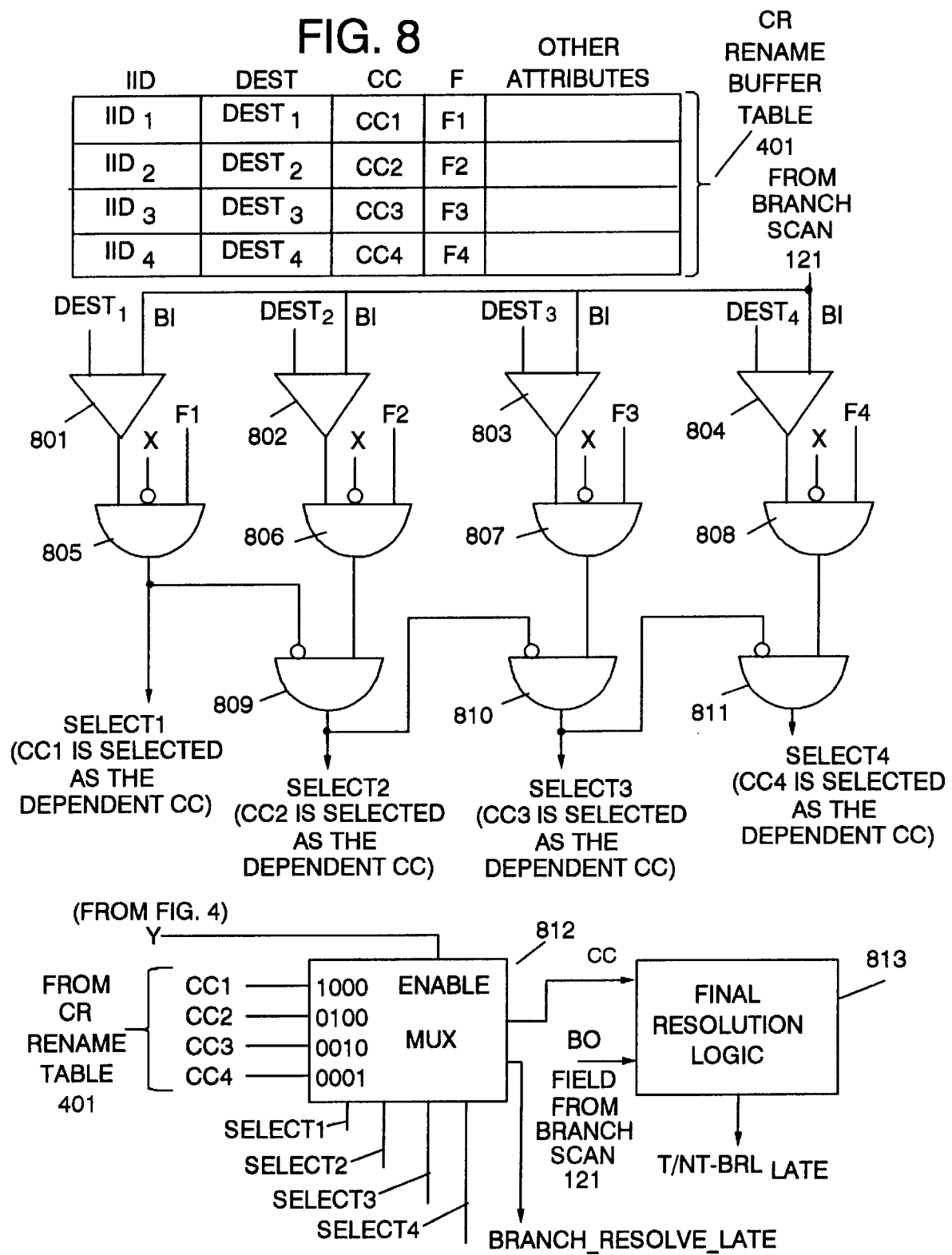
FIG. 8 illustrates logic invoked at execution time.

Referring next to FIG. 8, there is illustrated a part of the logic invoked at execution time (beginning at machine cycle n+1, where n is the cycle in which a given branch was scanned and processed), to resolve the branch if possible. The CR Rename Buffer Table 401 is shown again. The logic shown tries to detect if one of the entries in this table (401) already has the CC on which the branch to be resolved is dependent. Basically, this search of entries must be done beginning with the oldest entry (corresponding to IID$_1$) down through the most recent entry (corresponding to IID$_4$). Each of the comparators (801 through 804) tests for a match between the corresponding destination field and the field implied by the BI bit of the scanned branch. If there is a match, and if the corresponding CR-producing instruction is already finished, (indicated by the 'F' field) then the, corresponding CC entry is a viable candidate for selection as the true dependent CC. (Of course, such an inference would be valid only if the X signal from FIG. 3 was negatively asserted in the previous cycle n. Hence, we show each AND gate 805 through 808 having an input $\bar{X}$, which is derived from the corresponding latched value generated in the previous cycle). The logic, shown ensures that of the four "Select" signals (outputs of AND gates 805, 809, 810 and 811), only one can be asserted positively. For example, if Select2 is the only one assessed, it would mean that the oldest entry in the table (401) for which a viable match was detected, is entry number 2. If none of the Select signals are asserted positively, it would signify that the dependent CC is not available in the CR Rename Buffer Table. This could be because the CR-modifying instruction is still not finished, or because it has already completed, in which case, the CC should be read from the architected register. (The latter case is handled by the additional late resolution logic, shown in FIG. 9, as discussed in the next paragraph). The multiplexer box 812 is used to select the correct condition code field from the available entries CC1 through CC4. The multiplexer selection decision must be enabled by Y (from FIG. 4) generated in the same cycle (n+1), because, we must first ensure that the branch is actually resolvable in this cycle, based on previous dependency checks. Note that if none of the Select control signals (Select1 through Select4) are positively asserted, the output Branch_Resolve_Late signal will remain negated; Branch_Resolve_Late will positively assert only if one of the Select signals is positively asserted. That is, Branch_Resolve_Late in FIG. 8 is derived inside the MUX 812 logically as, Branch_Resolve_Late=Select1⊕Select2⊕Select3⊕Select4

(In practical reality, the function of the MUX 812 can be integrated with the generation of the Select signals itself via lower-level circuit design techniques, to make the Branch_Resolve_Late signal stable within this machine cycle (n+1). Such transistor-level circuit design details are not discussed here; only the logical steps and partitioning of the resolution logic are presented).

Once the correct CC field has been selected, and Branch_Resolve_Late has been asserted, the final resolution logic 813 is used to set the resolved direction (Taken/Not-Taken), via the output flag T/NT-BRL$_{late}$. This logic is identical to that embodied to implement the dotted decision box shown earlier in FIG. 6. Hence it is not discussed again.

Figure 9:
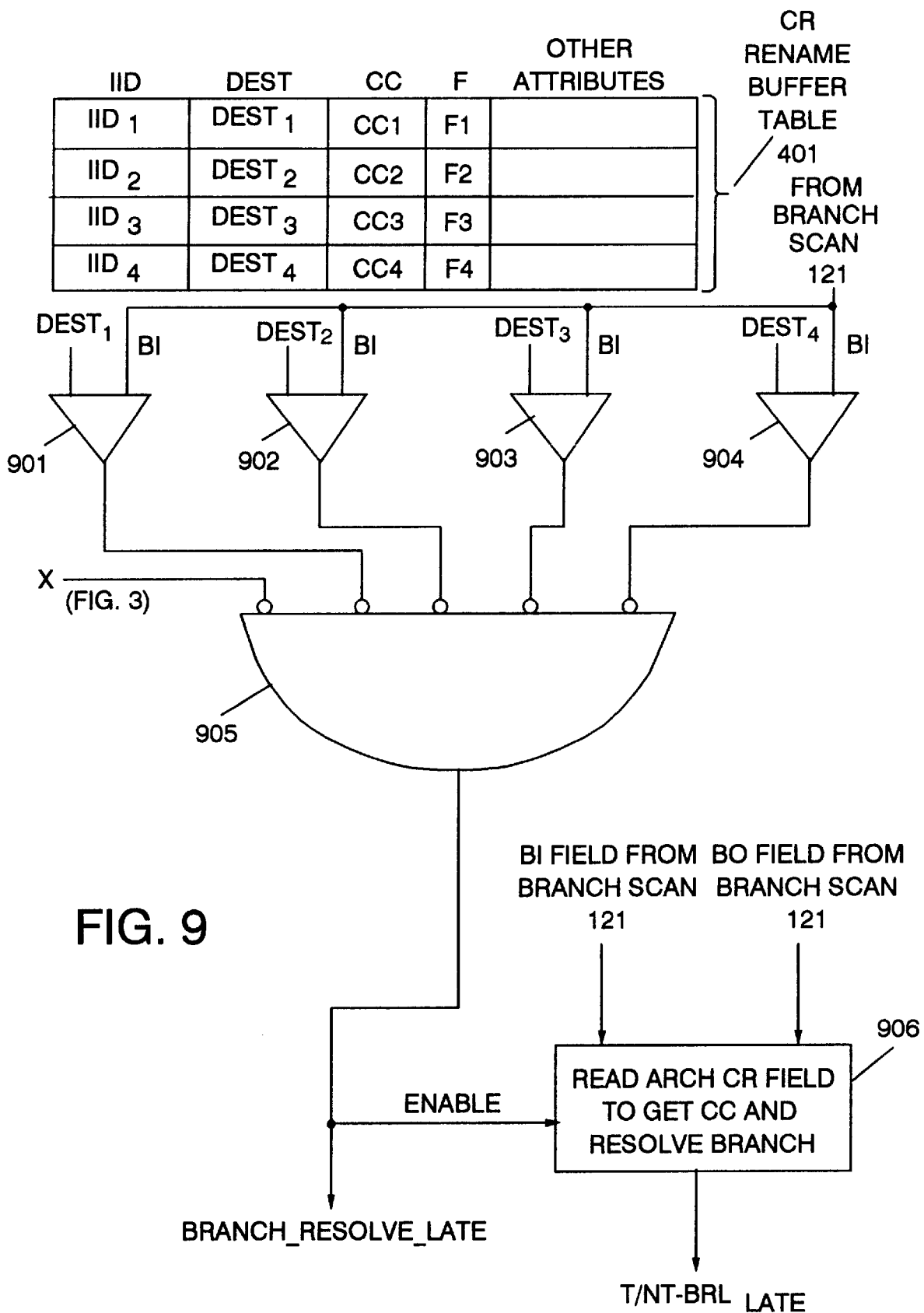
FIG. 9 illustrates late resolution logic.

Referring now to FIG. 9, there is illustrated additional late resolution logic, invoked in parallel (i.e., in cycle n+1) with the logic shown in FIG. 8, to enable resolution in case it is determined that the dependent CC is already available in the architected CR. Comparators 901–904 each output a '0' if the corresponding destination entry (DEST) does not match with that implied by the BI specification. If none of the entries match, AND gate 905 positively asserts the Branch_Resolve_Late signal, which enables the operation of the logic block 906, to produce a valid T/NT-BRL$_{late}$ signal. The logic within block 906 is identical to that in block 518 of FIG. 5 (flow-chart shown in FIG. 6), and is not elaborated upon again in this context. AND gate 905 has an extra input, $\bar{X}$ (FIG. 3, previous cycle's value) to make sure that the dependent CC is not produced by an instruction which was still waiting to be dispatched in the previous cycle. (Note that the overall Branch_Resolve_Late signal generated by the resolution logic is a logical exclusive OR of the corresponding signals generated by the logic shown in FIGS. 8 and 9. This extra exclusive OR gate is not shown, but is implied through this discussion. Similarly, the paired T/NT-BRL$_{late}$ output is finally muxed out, depending on which one of the above late resolution signals assert; from the description it should be clear that either the logic in FIG. 8 or that in FIG. 9, but not both, can produce the late resolution signals in cycle n+1).

Figure 10:
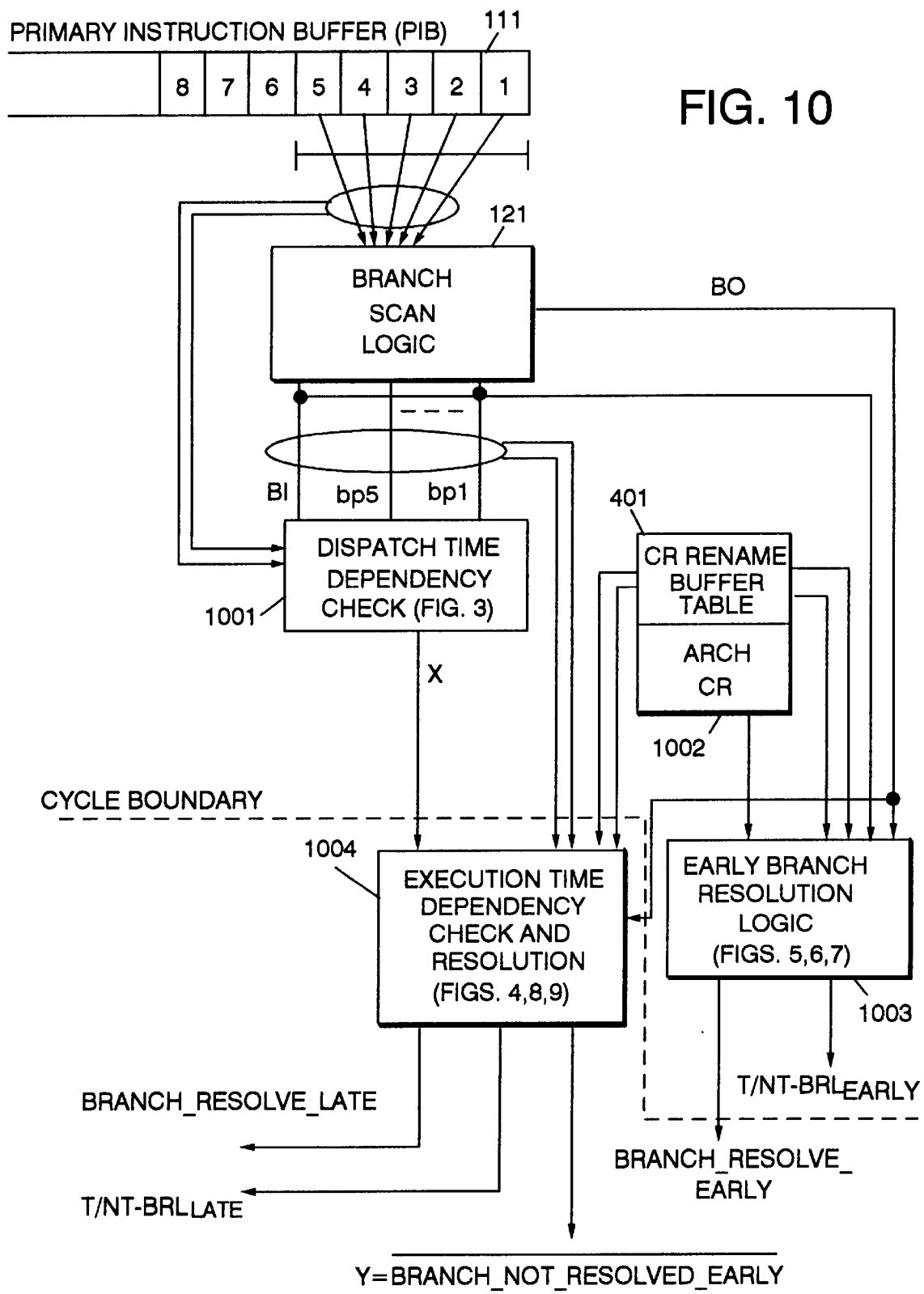
FIG. 10 illustrates an overall block diagram of the present invention.

Referring next to FIG. 10, there is shown an overall block diagram of the present invention describing the overall branch processing and resolution scheme in summarized, high-level form. As noted before, branch scan logic 121 scans the first five positions of PIB 111 and produces the bp1 . . . bp5, BI and BO fields. The BI and BO values, if valid, refer to the first scanned branch in the PIB 111. The signals/values bp1 . . . bp5 and BI are delivered to logic circuitry 1001, illustrated in detail in FIG. 3. Logic circuitry 1001 also receives bits 0 . . . 8 from the scanned instructions. Logic circuitry 1001 operates to produce the X (="Inhibit_Further_Resolution") signal, which is supplied to logic circuitry 1004, which was described in detail in the context of FIGS. 4, 8, and 9. Logic circuitry 1004 also receives the bp1 . . . bp5, BI and BO signals from branch scan logic 121 and monitors certain fields from the rename buffer table 401. Logic circuitry 1004 produces the "Branch_Resolve_Late" signal and the T/NT-BRL$_{late}$ signal which are used as final resolution signals to correct mispredicted program flow, if required. It also produces the signal Y (=Branch_not_ resolvable_early) signal which is used to determine if logic circuitry 1004 needs to be invoked again in the next cycle, because the branch could not be resolved yet. If indeed multi-cycle resolution is deemed necessary, the Y signal is also used to inhibit the process of branch scan in the following cycle.

Logic circuitry 1003 is the early branch resolution logic, which was described in more detail with respect to FIGS. 5, 6 and 7. In its most general form, logic circuitry 1003 receives all of the bp1 . . . bp5 signals as well as BI and BO, from the Branch Scan Logic 121. It also monitors certain fields within the rename buffer table 401. The outputs from logic circuitry 1003 are the T/NT-BRL$_{early}$ signal and the Branch_Resolve_Early signal; the later is supplied to MUX 203 shown in FIG. 2, as the select signal to choose between BHT-prediction and early branch resolution. As discussed with respect to FIG. 7, logic circuitry 1003 may use only a subset of bp1 . . . bp5 signals to implement a less aggressive version of the PIB Independence Check Logic 517 (FIG. 5), to meet-implementation-specific machine cycle time constraints. The simplest implementation would use only bp1 (see FIG. 7(*b*)), but would cover a much smaller number of branches in providing the benefit of early resolution, compared to the more general solution shown in FIG. 7(*a*)).

In FIG. 10, we also indicate the machine cycle boundary implied in our earlier descriptions of the branch resolution circuitry. Essentially, in our description, we have illustrated the branch resolution process as a two-stage pipelined process. The first stage (cycle n) consists of scanning for the first branch in the PIB 111, using Branch Scan Logic 121, dispatch-time dependency check using logic circuitry 1001 and early branch resolution via logic circuitry 1003. The second stage (cycle n+1) provides execution time dependency check and resolution. A branch resolution takes only 1 cycle if early resolution is possible, in which case use of the second stage (logic circuitry 1004) is inhibited for that branch. If early resolution is not possible, the branch resolution process takes at least another cycle in using the second stage, (logic circuitry 1004). Thus, if either 1 or 2 cycles are needed for each branch resolution, the overall logic is able to scan/process up to 1 distinct branch every cycle. However, if the branch cannot be resolved via a single use of the second stage (logic block 1004), it may need to spend 1 or more additional cycles to complete its resolution, by repeated invocation of logic circuitry 1004. During these additional cycles, the branch scan process is inhibited (using control signal Y), to maintain desired control of the two-stage pipeline flow.

Figure 11:
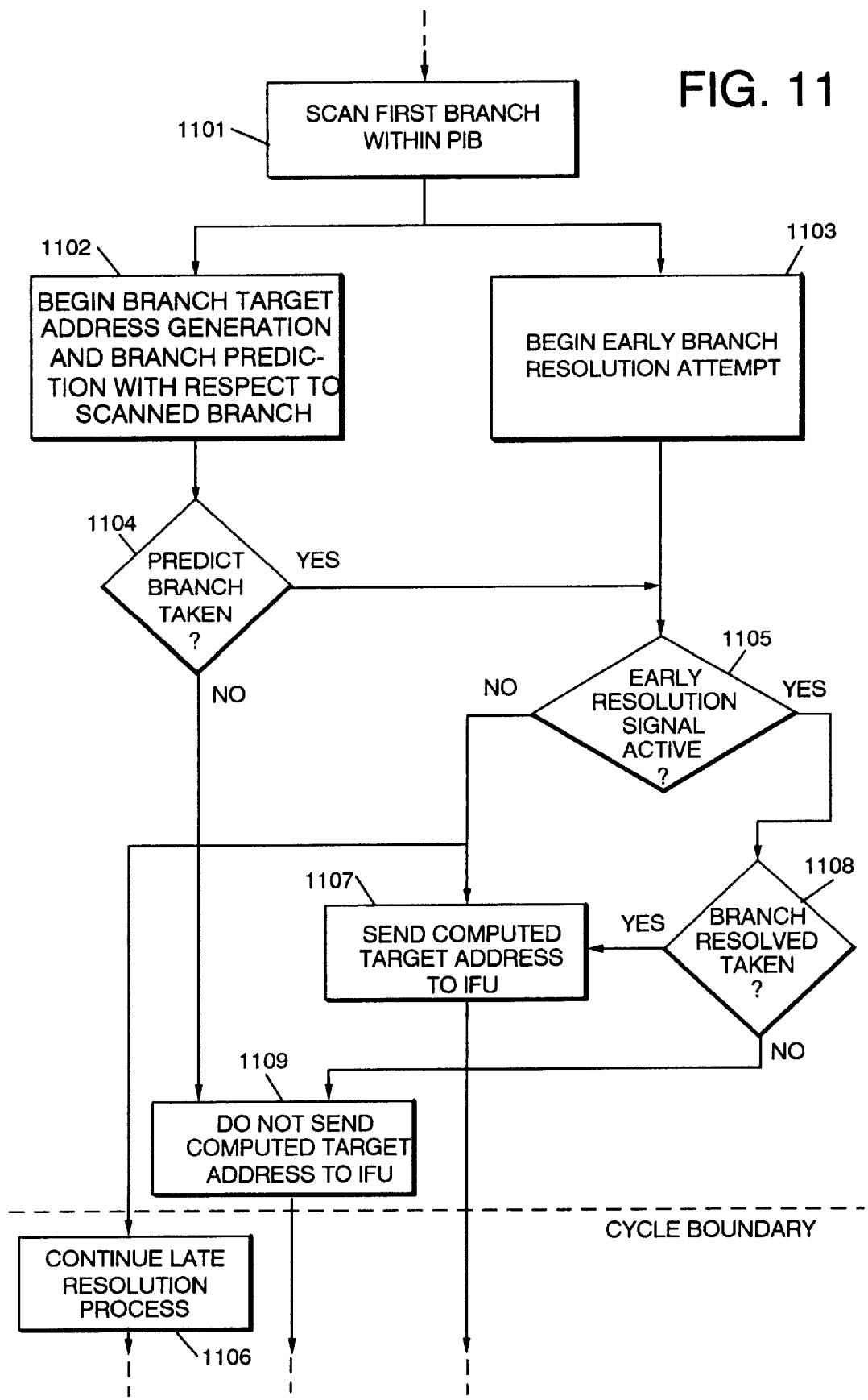
FIG. 11 illustrates a flow diagram in accordance with the present invention.

Referring next to FIG. 11, there is illustrated a flow diagram of the process for making use of the early resolution signal, if available during the cycle of branch scan (from logic circuitry 1004) in prevailing over the BHT-based prediction. At step 1101, branch scan within PIB 111 is effected. In step 1102, branch target address computation and branch outcome prediction is started with respect to the first branch scanned. In parallel step 1103, the early branch resolution process is initiated. Thereafter, in step 1104, a determination is made whether or not the branch has been predicted to be taken. At about the same time, it is determined whether the early resolution signal is active. If it is active, the branch predictor's guess is ignored and the resolved branch direction is used to decide whether to send the computed address to the IFU (step 1107) or not to send the address (step 1109). If the early resolution signal is not active, then the branch predictor's guess about branch direction is used to invoke either step 1107 or step 1109, as needed. If the early resolution signal is not active in the branch scan cycle, further steps in late resolution are triggered for the next cycle (step 1106).

Figure 12:
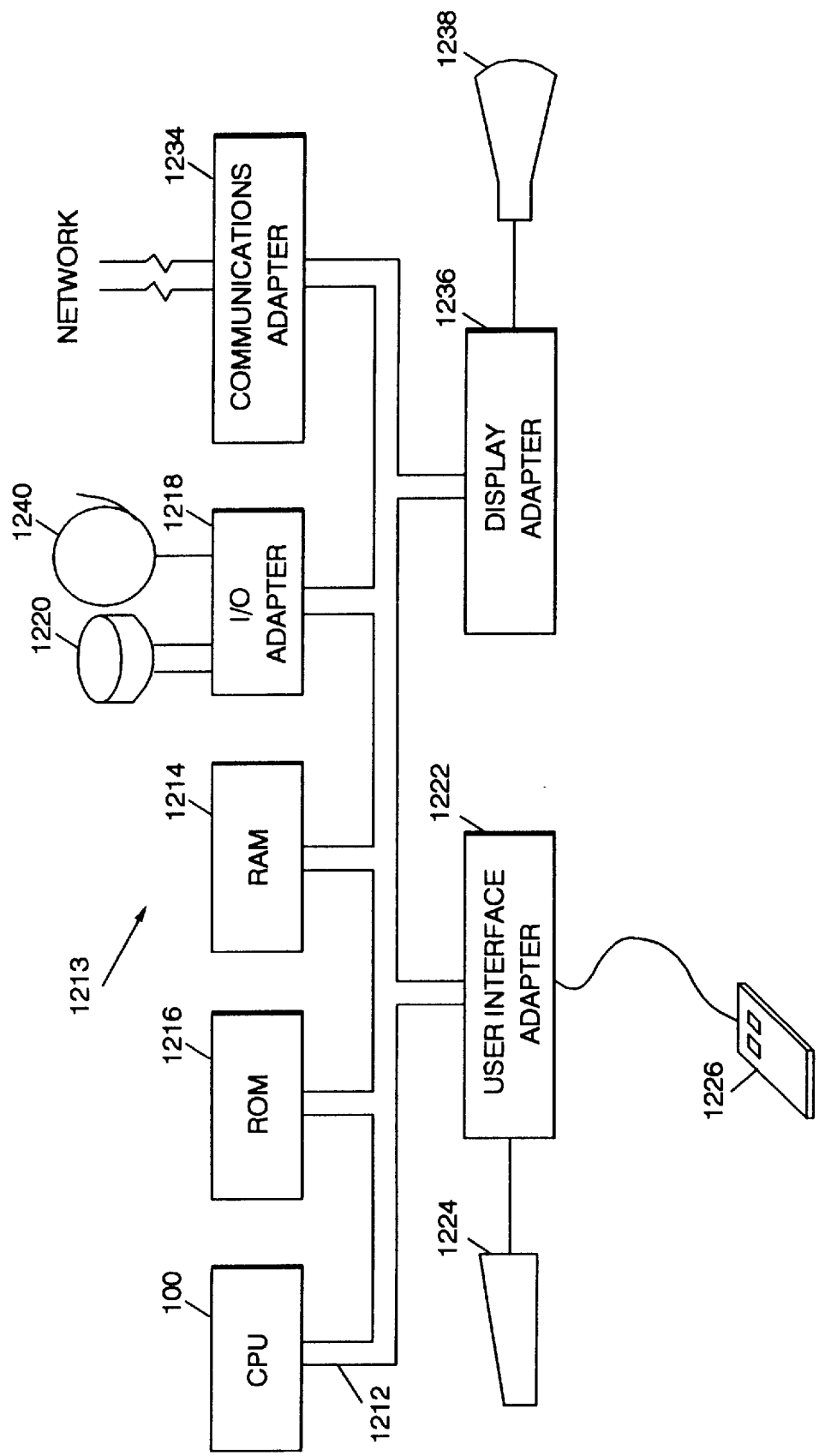
FIG. 12 illustrates a representative hardware system utilizing the present invention.

A representative hardware environment for practicing the present invention is depicted in FIG. 12, which illustrates a typical hardware configuration of workstation 1213 in accordance with the subject invention having central processing unit (CPU) 100, such as a conventional microprocessor, and a number of other units interconnected via system bus 1212. Workstation 1213 includes random access memory (RAM) 1214, read only memory (ROM) 1216, and input/output (I/O) adaptor 1218 for connecting peripheral devices such as disk units 1220 and tape drives 1240 to bus 1212, user interface adapter 1222 for connecting keyboard 1224, mouse 1226, and/or other user interface devices such as a touch screen device (not shown) to bus 1212, communication adapter 1234 for connecting workstations 1213 to a data processing network, and display adapter 1236 for connecting bus 1212 to display device 1238. CPU 100 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. In a processor, a method comprising the steps of:
   scanning an instruction buffer for a conditional branch instruction, wherein resolution of said conditional branch instruction is dependent upon a value in a condition register;
   generating a target address associated with said conditional branch instruction;
   predicting an outcome of said conditional branch instruction; and
   inhibiting branch prediction-directed transmission of said target address to an instruction fetch unit when said conditional branch instruction is resolvable previous to execution of said conditional branch instruction.

2. The method as recited in claim 1, wherein said branch instruction is located in a first dispatchable position of said instruction buffer when said branch instruction is scanned during said scanning step.

3. The method as recited in claim 2, wherein said inhibiting step further comprises the step of:
   determining that no destination condition register fields in a rename table match a dependent condition register specified in said branch instruction.

4. The method as recited in claim 3, wherein said branch instruction is resolved within a branch scan cycle.

5. The method as recited in claim 3, wherein an architected condition register has been updated with a dependent condition code.

6. The method as recited in claim 3, wherein said processor has dynamic branch prediction capability.

7. The method as recited in claim 6, wherein said processor is a pipelined and/or superscalar processor with speculative execution controlled by a branch prediction facility in said processor.

8. The method as recited in claim 1, wherein said branch instruction is located in a position of said instruction buffer wherein said branch instruction does not depend on any yet to be dispatched instructions located in any positions of said instruction buffer before said branch instruction.

9. The method as recited in claim 8, wherein said branch instruction is located in any position of said instruction buffer except a first dispatchable position of said instruction buffer.

10. The method as recited in claim 8, wherein resolution of said branch instruction comprises the step of determining that no destination condition register fields in a rename table match a dependent condition register specified in said branch instruction.

11. The method as recited in claim 10, wherein said branch instruction is resolved within a processor cycle.

12. A processor comprising:
   an instruction buffer adaptable for storing N instructions retrieved from memory;
   branch scan logic adaptable for scanning M positions of said instruction buffer for a branch instruction, wherein M≦N;
   a branch address generator adaptable for generating a target address associated with said branch instruction;
   branch prediction logic adaptable for predicting whether said branch instruction will be taken, wherein said target address is typically sent to an instruction fetch unit when said branch instruction is predicted as being taken; and
   logic circuitry adaptable for inhibiting sending of said target address to said instruction fetch unit when said branch instruction is resolvable, wherein said branch instruction is located in a first dispatchable position of said instruction buffer when said branch instruction is scanned by said branch scan logic.

13. A processor comprising:
   an instruction buffer adaptable for storing N instructions retrieved from memory;
   branch scan logic adaptable for scanning M positions of said instruction buffer for a branch instruction, wherein M≦N;
   a branch address generator adaptable for generating a target address associated with said branch instruction;
   branch prediction logic adaptable for predicting whether said branch instruction will be taken or not taken, wherein said target address is typically sent to an instruction fetch unit when said branch instruction is predicted as being taken;
   branch resolution logic circuitry adaptable to attempt resolution of an outcome of said branch instruction as a function of a value of contents of a condition register upon which said branch instruction depends;
   said branch resolution logic circuitry adaptable for inhibiting sending of said target address to said instruction fetch unit when said branch instruction is resolvable early as being not taken;
   said branch resolution logic circuitry adaptable for enabling the sending of said target address to said instruction fetch unit when said branch instruction is resolvable early as being taken.

14. The processor as recited in claim 12, wherein said inhibiting logic circuitry further comprises:
   circuitry for determining that no destination condition register fields in a rename table match a dependent condition register specified in said branch instruction.

15. The processor as recited in claim 12, wherein said branch instruction is resolved within a processor cycle.

16. The processor as recited in claim 14, wherein an architected condition register has been updated with a dependent condition code.

17. The processor as recited in claim 12, wherein said processor has dynamic branch prediction capability.

18. The processor as recited in claim 17, wherein said processor is a superscalar processor.

19. The processor as recited in claim 12, wherein said inhibiting logic circuitry is adaptable for enabling sending of said target address if said branch instruction is resolved to be "taken."

20. The processor as recited in claim 12, wherein said branch instruction is located in a position of said instruction buffer where said branch instruction does not depend on any instructions to be dispatched earlier from said instruction buffer than said branch instruction.

21. A data processing system comprising:
   a superscalar processor, a memory device, and input/output devices coupled together by a bus, wherein said processor further comprises:
   an instruction buffer adaptable for storing N instructions retrieved from said memory device;
   branch scan logic adaptable for scanning M positions of said instruction buffer for a branch instruction, wherein M≦N, wherein said branch instruction is located in a first dispatchable position of said instruction buffer when said branch instruction is scanned by said branch scan logic;
   a branch address generator adaptable for generating a target address associated with said branch instruction;
   branch prediction logic adaptable for predicting whether said branch instruction will be taken, wherein said target address is typically sent to an instruction fetch unit when said branch instruction is predicted as being taken; and
   logic circuitry adaptable for inhibiting sending of said target address to said instruction fetch unit when said branch instruction is resolvable.

22. The system as recited in claim 21, wherein said inhibiting logic circuitry further comprises:
   circuitry for determining that no destination condition register fields in a rename table match a dependent condition register specified in said branch instruction.

23. The method as recited in claim 1, wherein said conditional branch instruction is resolvable previous to decoding of said conditional branch instruction.

24. A processor comprising:
   an instruction buffer adaptable for storing N instructions retrieved from memory:
   branch scan logic adaptable for scanning M positions of said instruction buffer for a branch instruction, wherein M≦N;
   a branch address generator adaptable for generating a target address associated with said branch instruction;
   branch prediction logic adaptable for predicting whether said branch instruction will be taken, wherein said target address is typically sent to an instruction fetch unit when said branch instruction is predicted as being taken: and
   logic circuitry adaptable for inhibiting sending of said target address to said instruction fetch unit when said branch instruction is resolvable, wherein said branch instruction is resolved within a processor cycle, wherein said branch instruction is a conditional branch instruction.

25. The processor as recited in claim 24, wherein said conditional branch instruction is dependent upon a value in a condition register.

26. The processor as recited in claim 12, wherein said branch instruction is resolvable previous to execution of said branch instruction.

27. The system as recited in claim 21, wherein said branch instruction is a conditional branch instruction.

28. The system as recited in claim 27, wherein said conditional branch instruction is dependent upon a value in a condition register.

29. The system as recited in claim 21, wherein said branch instruction is resolvable previous to execution of said branch instruction.

30. The method as recited in claim 1, wherein the conditional branch instruction is resolvable early as being not taken, and wherein transmission of said target address to said instruction fetch unit is inhibited even if branch prediction logic has predicted said branch instruction as being taken, further comprising the steps of:

enabling transmission of said target address to said instruction fetch unit when said conditional branch instruction is resolvable early as being taken previous to execution of said conditional branch instruction, even if said branch prediction logic has predicted said branch instruction as being not taken; and performing branch resolution to enable cancellation of any mispredicted instruction execution sequence.

* * * * *